S. D. LOUNT,

Assignor of one-half interest to D. A. ROBERTS & S. P. WELLS.

PUMPS FOR CONTINUOUS DISCHARGE.

No. 7,302. Reissued Sept. 5, 1876.

Witnesses:
Philip F. Larner
A. B. Claudwell

Inventor
Samuel D. Lount
By Wm. C. Ward
Attorney

N. PETERS, PHOTO-LITHOGRAPHER, WASHINGTON, D. C.

UNITED STATES PATENT OFFICE.

SAMUEL D. LOUNT, OF CHATTANOOGA, TENNESSEE, ASSIGNOR OF ONE-HALF INTEREST TO DAVID A. ROBERTS, OF RATHBONE, AND SOLOMON P. WELLS, OF PARKERSBURG, WEST VIRGINIA.

IMPROVEMENT IN PUMPS FOR CONTINUOUS DISCHARGE.

Specification forming part of Letters Patent No. 92,621, dated July 13, 1869; reissue No. 7,302, dated September 5, 1876; application filed August 28, 1875.

*To all whom it may concern:*

Be it known that I, SAMUEL D. LOUNT, of Chattanooga, in the county of Hamilton and State of Tennessee, formerly of Rathbone, in the county of Wirt and State of West Virginia, have invented a new and Improved Pump; and I do hereby declare that the following is a full, clear, and exact description of the construction and operation of the same, reference being had to the accompanying drawings, making a part of this specification, in which—

Figure 1:
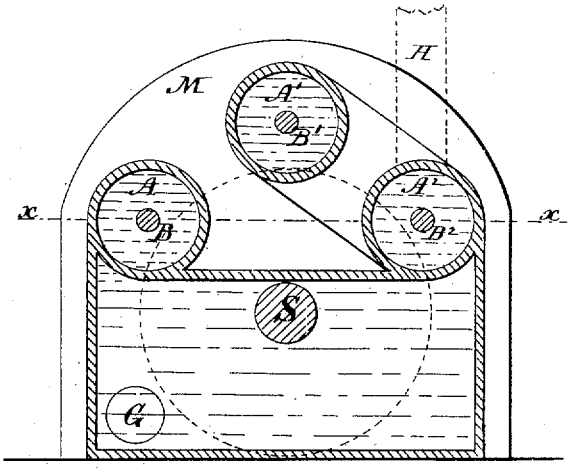
Figure 2:
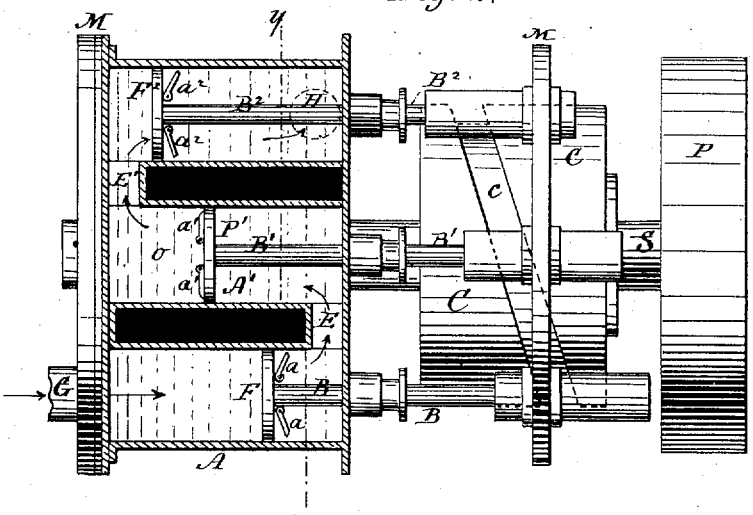

Figure 1 is a cross-section through line *y y* of Fig. 2. Fig. 2 is a longitudinal section through line *x x* of Fig. 1.

My pump is so constructed that it will discharge a full and rapid stream of water continuously, and with uniformity of pressure. Prior to my invention pumps have been made, having a similar capacity, but their construction rendered them necessarily expensive, and comparatively difficult to keep in working order. So far as my knowledge extends no pump was ever made prior to my invention possessing the operative characteristics referred to, which did not involve three or four pistons in the same pump-barrel. Pumps of this construction necessarily involve a packing, not only between each piston and the surface of the barrel with which it engages in packing contact, but they also involve a piston-rod for each piston and numerous packed points.

In some cases the lower piston of such pumps has a solid piston-rod, and the other pistons have hollow rods, within which the other rod or rods are operated. In other pumps of this class the upper pistons have been provided with two rods each, in which case all but the lower piston have one or more packed openings for the reception of the rod or rods of the lower piston or pistons, and also a packing-gland for each piston-rod, which passes through the head of the pump-barrel.

Aside from the heavy expense of construction involved in such pumps, they are open to practical objection, in that, when any interior packing is deranged, or any internal repair required, the entire pump must be taken apart.

Moreover, in this class of pumps two of the pistons are necessarily connected with the driving-shaft by means of offset piston-rods, which incur more or less side strain, and result in speedy wear of the working parts.

The main object of my improvement is the production of a pump which, having the capacity of a continuous discharge of water under a uniform pressure, and with uniform velocity, is simple and comparatively inexpensive, and may be readily kept in order; and my invention consists, mainly, in the combination of three or more separate pump-barrels or cylinders, connected by a water-way, forming one continuous passage through all the barrels, a piston in each barrel provided with a valve or valves, which open on the side of the piston farthest from the induction-aperture to the barrel, and mechanism for imparting to each of the pistons a reciprocating movement.

In operation, a continuous stream of water will be taken into one of the barrels, passed through each of them, and discharged from the one through which it finally passes.

In the drawings, M M is the frame of the pump; P, the pulley which applies the power; S, the driving-shaft; C, a cam-wheel on shaft S, having an inclined groove, *c*, around it, as shown in Fig. 2; B $B^1$ $B^2$, three plunger-rods, caused to reciprocate, one after the other, by the movement of cam *c*, as shaft S is rotated; A $A^1$ $A^2$, three cylinders, connected by the passages E $E^1$; F $F^1$ $F^2$, the pump-pistons, attached to the rods B $B^1$ $B^2$, and operating in the cylinders A $A^1$ $A^2$, respectively; G, the induction-pipe; H, the eduction-pipe; *a a* $a^2$ $a^2$, valves, opening upward, and $a^1$ $a^1$ valves opening downward, the water in its passage through the pump taking the direction indicated by the arrows.

Instead of the cam-track, for the purpose of operating the rods B $B^1$ $B^2$, cranks, or other equivalent device, arranged upon one or more shafts, may be employed. In such case the cranks should be arranged to follow each other at intervals of about sixty degrees, while, if the cam-track be employed, the cylinders should all be set in a semicircle, as shown in Fig. 1, at intervals of sixty degrees from each other. The object of this construction is that the water may always be impelled by that crank or that part of the cam which is moving up or down most rapidly at any particular time, while those cranks or portions of the cam-track which are passing the dead-points shall have ceased for the moment to have much, if any, effect upon the stream. For example, the rod of piston F, Fig. 2, is at its highest elevation, and passing the upper dead-point. At this moment the next piston, moved by that portion of the cam-track which descends most rapidly, is being swiftly forced downward with its valves closed, and pushing before it all the water in its cylinder. The effect of the swifter motion of the piston $F^1$ is to draw open the two valves of piston F, and keep a rapid flow of water following, while at the same time, moving more rapidly than piston $F^2$, which is at or near the lower dead-point, it forces the water at *o* through the passage $E^1$ into cylinder $A^2$, and through valves $a^2$ $a^2$ to the eduction-pipe. As soon as the piston $F^1$ approaches its dead-point one of the others is nearing the point where it moves upward most rapidly. In every case the lifting or forcing power is necessarily applied by the most rapidly-moving piston, and the water driven by this piston faster than the other pistons are moving opens their valves, and passes along without obstruction from said pistons, because all are operating in a series of pump-barrels having one water-passage or water-way. In fact, as heretofore stated, three pistons may be arranged in a single cylinder, one over the other, to operate in the same way, for effecting a similar result; but it is to obviate the practical disadvantages attendant upon the manufacture and use of such pumps that my present invention is intended. My pump having a separate cylinder for each piston renders each cylinder readily accessible for repairs without disturbing any of the other cylinders. It requires no packing-glands, except at the head of each cylinder, and no hollow rods or duplicate rods, as with the pre-existing pumps, which have a similar mode of operation.

Although in the drawings the piston in the central chamber is shown with valves which open upon its lower side, while the other pistons have valves which open on their upper sides, it will be seen that such an arrangement of the valves is only due to the fact that the induction-aperture of the central barrel is at its top, and that it is essential that the valve should open on that side of the piston which is farthest from the induction-passage to the cylinder, while the induction-apertures of the other barrels are at their lower ends; but it is obvious that neither of the pistons need have valves which open downward, provided the passages E E′ are arranged to carry the water from the top of one cylinder to the bottom of the next cylinder in the series, and the cranks or other device follow each other at intervals of about one hundred and twenty degrees.

I do not claim, broadly, a pump having three cylinders, for I am aware that pumps having even a larger number have for a long time been in use.

In my invention, as before remarked, the three cylinders (and there may be more of them) are but parts of one passage-way for the water, and the three pistons all operate upon the same continuous stream.

What I claim as new, and desire to secure by Letters Patent, is—

A pump consisting of three or more barrels or cylinders, connected by passages which afford a continuous water-way through all of the cylinders, in combination, substantially as herein described, with a piston in each cylinder, provided with a valve or valves which open on the side thereof farthest from the induction-passage of the cylinder, and mechanism for imparting to each piston a reciprocating movement, substantially as and for the purposes set forth.

SAML. D. LOUNT.

Witnesses:
GEO. LOUNT,
PHILIP F. LARNER.